US011212229B2

United States Patent
K S et al.

(10) Patent No.: US 11,212,229 B2
(45) Date of Patent: Dec. 28, 2021

(54) EMPLOYING MACHINE LEARNING TO PREDICT AND DYNAMICALLY TUNE STATIC CONFIGURATION PARAMETERS

(71) Applicant: Juniper Networks, Inc., Sunnyvale, CA (US)

(72) Inventors: Nithyananda Vishnu K S, Tamil Nadu (IN); Sasikumar Sekar, Salem (IN); Jeevan Madhu Chakravarthy Dandangi, Bangalore (IN); Ramasubramaniam Ganesan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 83 days.

(21) Appl. No.: 16/600,112

(22) Filed: Oct. 11, 2019

(65) Prior Publication Data

US 2021/0112011 A1     Apr. 15, 2021

(51) Int. Cl.
  *H04L 12/853* (2013.01)
  *G06N 20/00* (2019.01)
  *H04L 12/24* (2006.01)
  *H04L 29/12* (2006.01)

(52) U.S. Cl.
  CPC ......... *H04L 47/2416* (2013.01); *G06N 20/00* (2019.01); *H04L 41/5009* (2013.01); *H04L 61/2521* (2013.01)

(58) Field of Classification Search
  CPC ............. H04L 47/2416; H04L 41/5009; H04L 61/2521; G06N 20/00
  See application file for complete search history.

(56) References Cited

U.S. PATENT DOCUMENTS

| 7,219,239 | B1 * | 5/2007 | Njemanze | ........... H04L 63/0218 726/21 |
| 8,050,559 | B2 | 11/2011 | Sindhu | |
| 8,270,309 | B1 * | 9/2012 | Jones | .................. H04L 43/0852 370/248 |

(Continued)

FOREIGN PATENT DOCUMENTS

EP           3416336 A1       12/2018

OTHER PUBLICATIONS

A comprehensive survey on machine learning for network evolution, applications and research opportunities.—Raouf Boutaba, Mohammed A. Salahuddin, Noua Limam, Sara Ayoubi, Nashid Shahriar, Felipe Estrada-Solano and Oscar M. Caicedo—Journal of Internet Services and Applications—Jun. 21, 2018 (Year: 2018).*

(Continued)

*Primary Examiner* — Tejis Daya
(74) *Attorney, Agent, or Firm* — Shumaker & Sieffert, P.A.

(57) ABSTRACT

A system and method for dynamically altering static parameters on a live network device is disclosed. The system includes a live network device having a plurality of parameters configured thereon that control the application of services to subscriber packet flows and a machine learning device operable to monitor the subscriber packet flows and apply a machine learned model to identify patterns in the monitored subscriber pack flows. The machine learning device is further operable to dynamically alter at least one of the plurality of parameters on the network device based upon the patterns in the monitored subscriber packet flows.

18 Claims, 8 Drawing Sheets

(56) References Cited

U.S. PATENT DOCUMENTS

| | | | |
|---|---|---|---|
| 8,654,765 B2* | 2/2014 | Singh | H04L 43/04 370/389 |
| 8,701,179 B1 | 4/2014 | Penno et al. | |
| 9,258,272 B1 | 2/2016 | Durand et al. | |
| 9,349,006 B2* | 5/2016 | Zhou | G06F 21/562 |
| 9,479,597 B2* | 10/2016 | Vinapamula Venkata | H04L 67/141 |
| 9,602,465 B2* | 3/2017 | Jain | H04L 61/2567 |
| 9,674,074 B2* | 6/2017 | Nguyen | H04L 45/18 |
| 9,794,109 B2* | 10/2017 | McKinney | H04L 67/14 |
| 2008/0130958 A1* | 6/2008 | Ziomek | G06K 9/00825 382/116 |
| 2009/0328219 A1* | 12/2009 | Narayanaswamy | H04L 63/20 726/23 |
| 2010/0153316 A1 | 6/2010 | Duffield et al. | |
| 2016/0028608 A1 | 1/2016 | Dasgupta et al. | |
| 2016/0110657 A1* | 4/2016 | Gibiansky | G06N 20/00 706/12 |
| 2016/0277299 A1* | 9/2016 | Kadaba | H04L 41/142 |
| 2017/0279837 A1 | 9/2017 | Dasgupta et al. | |
| 2017/0339022 A1 | 11/2017 | Hegde et al. | |
| 2019/0089675 A1* | 3/2019 | Taniguchi | H04L 61/2517 |
| 2019/0223236 A1* | 7/2019 | Sebastian | H04W 76/22 |

OTHER PUBLICATIONS

Machine Learning for Cognitive Network Management—Sara Ayoubi, Noura Limam, Mohammed A. Salahuddin, Nashid Shahriar, Raouf Boutaba, Felipe Estrada-Solano and Oscar Caicedo—IEEE Communications Magazine—vol. 56, Issue 1, Jan. 2018 (Year: 2018).*

Software-Defined Wide Area Network (SD-WAN): Architecture, Advances and Opportunities—Z. Yang, Y. Cui, B. Li, Y. Liu and Y. Xu—2019 28th International Conference on Computer Communication and Networks (ICCCN), Valencia, Spain, Jul. 29-Aug. 1, 2019, pp. 1-9 (Year: 2019).*

Quality of Experience Management in Mobile Cellular Networks: Key Issues and Design Challenges—Eirini Liotou, Dimitris Tsolkas, Nikos Passas, and Lazaros Merakos—IEEE Communications Magazine—Jul. 2016 (Year: 2016).*

OpenFLow Timeouts Demystified—Adam Zarek—Department of Computer Science—University of Toronto—2012 (Year: 2012).*

Durand et al., "Dual-Stack Lite Broadband Deployments Following IPv4 Exhaustion," RFC 6333, Internet Engineering Task Force (IETF), Aug. 2011, 32 pp.

Postel et al., "Internet Protocol," RFC 791, Internet Engineering Task Force, Sep. 1981, 49 pp.

Deering et al., "Internet Protocol, Version 6 (IPv6) Specification," RFC 2460, Network Working Group, The Internet Society, Dec. 1998, 39 pp.

"K Nearest Neighbors Classification" available at https://www.saedsayad.com/k_nearest_neighbors.htm (last accessed Aug. 23, 2019), Nov. 23, 2017, 3 pp.

Harrison, Onel "Machine Learning Basics with the K-Nearest Neighbors Algorithm" Towards Data Sccience, available at https://towardsdatascience.com/machine-learning-basics-with-the-k-nearest-neighbors-algorithm-6a6e71d01761 (last accessed Aug. 23, 2019) Sep. 10, 2018, 14 pp.

Brownlee, Jason "Your First Machine Learning Project in Python Step-By-Step" Python Machine Learning, available at https://machinelearningmastery.com/machine-learning-in-python-step-by-step/ (last accessed Aug. 23, 2019), Jun. 10, 2016, 245 pp.

Extended Search Report from counterpart European Application No. 20150278.8, dated Jul. 31, 2020, 10 pp.

Response to Extended Search Report dated Jul. 31, 2020 from counterpart European Application No. 20150278.8, filed Oct. 8, 2021, 16 pp.

* cited by examiner

EMPLOYING MACHINE LEARNING TO PREDICT AND DYNAMICALLY TUNE STATIC CONFIGURATION PARAMETERS

TECHNICAL FIELD

The disclosure relates to computer networks and more particularly, to dynamically tuning otherwise static configuration parameters of network devices in computer networks.

BACKGROUND

A computer network is a collection of interconnected devices, such as computers. Network devices may include, for example, carrier grade network address translation (CG-NAT) devices, software defined wide area network (SD-WAN) devices, and flow collection devices, among others.

Network devices may exchange data according to one or more communication protocols. The communication protocols define the format and manner in which the devices communicate the data. Example protocols include the Transmission Control Protocol (TCP) and the Internet Protocol (IP) that facilitate data communication by dividing the data into small blocks called packets. These packets are individually routed across the network from a source device to a destination device. The destination device extracts the data from the packets and assembles the data into its original form. Dividing the data into packets enables the source device to resend only those individual packets that may be lost during transmission. The protocols define the format and construction of the packet, including header and payload portions of the packets.

Periodically, it may be necessary to transition from one communication protocol to another. This may occur, for example, when a current communication protocol used within a network is upgraded to a newer version. As one example, the Internet is currently based on a communication protocol known as Internet Protocol version 4 (IPv4). IPv4 offers a ubiquitous network service, based on datagram (connectionless) operation, and on globally significant IP addresses to aid routing. It is becoming clear that certain elements of IPv4 are insufficient to support the growth of the Internet. For example, IPv4 makes use of a 32-bit address space. Internet Protocol version 6 (IPv6), however, makes use of a much larger 128-bit address space. However, development, standardization, implementation, testing, debugging and deployment of a new communication protocol can take a very large amount of time and energy, and is not guaranteed to lead to success.

A variety of approaches may be used in an attempt to provide a smooth transition from one communication protocol to another. One example approach that has been proposed is known as "dual-stack lite," as described in "Dual-Stack Lite Broadband Deployments Following IPv4 Exhaustion" to A. Durand et al., Internet Engineering Task Force (IETF) RFC 6333, August 2011. According to this approach, a residential gateway (also referred to herein as "customer premise equipment") located at a subscriber's premises acts as an ingress and egress for a tunnel that encapsulates IPv4 packets within IPv6 packets. These IPv4-over-IPv6 tunnels are commonly referred to as "softwires." The residential gateway forwards the IPv6 packets towards a router within a service provider network that decapsulates the IPv4 packets from the IPv6 packets. The router operates as an address family translation router (AFTR) and applies a network address translation (NAT) rule to each IPv4 packet, and forwards the IPv4 packets to the Internet. In the DS-Lite architecture, global IPv4 addresses are shared among subscribers in the AFTR, acting as a CG-NAT device. In this way, DS-Lite enables unmodified IPv4 application to access the IPv4 Internet over the IPv6 access network.

A computer network may also include a number of sites implemented as local area networks (LAN), which in turn may be geographically distributed over a wide area and interconnected by a wide area network (WAN). Typical sites, such as branch offices, data centers, campus/corporate offices, service networks, and other networks that communicate over a WAN, can have multiple WAN connection types, including Multiprotocol Label Switching (MPLS), Internet, and so on. In these traditional networks, the MPLS-based connection typically includes performance guarantees, or service level agreements (SLAs) to ensure business-critical applications can function properly; the Internet connection provides an alternative link for backup and load balancing purposes. However, with Internet access offerings providing ever-increasing bandwidth, many applications can now reasonably be routed over the Internet link.

Software-defined networking in a WAN (SD-WAN) is a connectivity solution implemented as an overlay on top of traditional WAN access. An SD-WAN solution provides the ability to make use of MPLS, Internet, and other WAN connection links. To interconnect sites and in some cases to provide secure site-to-site connectivity, SD-WAN typically involves virtual overlay networks based on overlay tunnels (sometimes referred to as SD-WAN tunnels) that transport traffic over the WAN.

Devices within a packet network, such as routers and switches, forward the packets through the network from a source device to a destination device. The destination device extracts the data from the packets and assembles the data into its original form.

Various protocols exist that allow the network devices, such as the routers and switches, to collect and report traffic statistics. For example, the network devices deploy sampling mechanisms that collect traffic statistics on interfaces of the device where traffic is received and/or transmitted. In accordance with the protocols, the network device may periodically export records containing traffic statistics to a centralized device referred to as a flow collector. In many network environments, the collector may receive traffic flow information via traffic flow packets sent from various network locations. Consequently, a user or network administrator can use the flow collector to analyze overall network traffic flow.

Network devices, such as CG-NAT, SD-WAN and flow collector network devices, may typically be provisioned before they are brought on-line or made live to handle subscriber packet flows. The provisioning process configures static parameters within the network device that define the way the network device functions when interacting with subscriber packet flows.

SUMMARY

In general, techniques for dynamically tuning static configuration parameters on network devices, such as CG-NAT, SD-WAN and flow collector network devices are disclosed. Machine learning may be utilized to improve network performance by dynamically tuning these static configuration parameters on the network devices while the network devices are live, or in other words, the network devices are on-line and actually operating on subscriber packet flows. For example, a machined learned model may identify patterns in monitored subscriber packet flows and a machine learning device may dynamically alter the parameters based on the monitored patterns to improve efficiency of the network.

A CG-NAT network device may be configured with static parameters such as a port block size, NAT mapping timeout values, NAT session inactivity timeout values and max-session-per-subscriber values, by way of example only. A machine learning device may dynamically alter these otherwise static parameters while the CG-NAT network device is live, or in other words on-line and operating on subscriber packet flows.

An SD-WAN network device may be configured with static parameters such as a create threshold, a deleted threshold, application quality of experience (APPQoE) service level agreement (SLA) parameters, an APPQoE probe interval and an APPQoE probe count, by way of example only. A machine learning device may dynamically alter these otherwise static parameters while the SD-WAN network device is live, or in other words on-line and operating on subscriber packet flows.

A flow collector network device may be configured with static parameters such as a flow inactivity timeout, an inactivity export timeout and an activity export timeout, by way of example only. A machine learning device may dynamically alter these otherwise static parameters while the flow collector network device is live, or in other words on-line and operating on subscriber packet flows.

In one example, a system comprises a live network device having a plurality of parameters configured thereon that control application of services to subscriber packet flows forwarded by the network device in a network, and a machine learning device operable to monitor the subscriber packet flows and apply a machine learned model to identify patterns in the monitored subscriber packet flows and operable to dynamically alter at least one of the plurality of parameters based upon the patterns in the monitored subscriber packet flows.

In another example, a method comprises monitoring, by a machine learning device, subscriber packet flows, applying, by the machine learning device, a machine learned model to identify patterns in the monitored subscriber packet flows, and dynamically altering at least one of a plurality of parameters of a live network device based upon the patterns in the monitored subscriber packet flows, wherein the plurality of parameters are configured on the live network device and control application of services to subscriber packet flows.

The details of one or more example aspects of the disclosure are set forth in the accompanying drawings and the description below. Other features, objects, and advantages will be apparent from the description and drawings, and from the claims.

DETAILED DESCRIPTION

Figure 1:
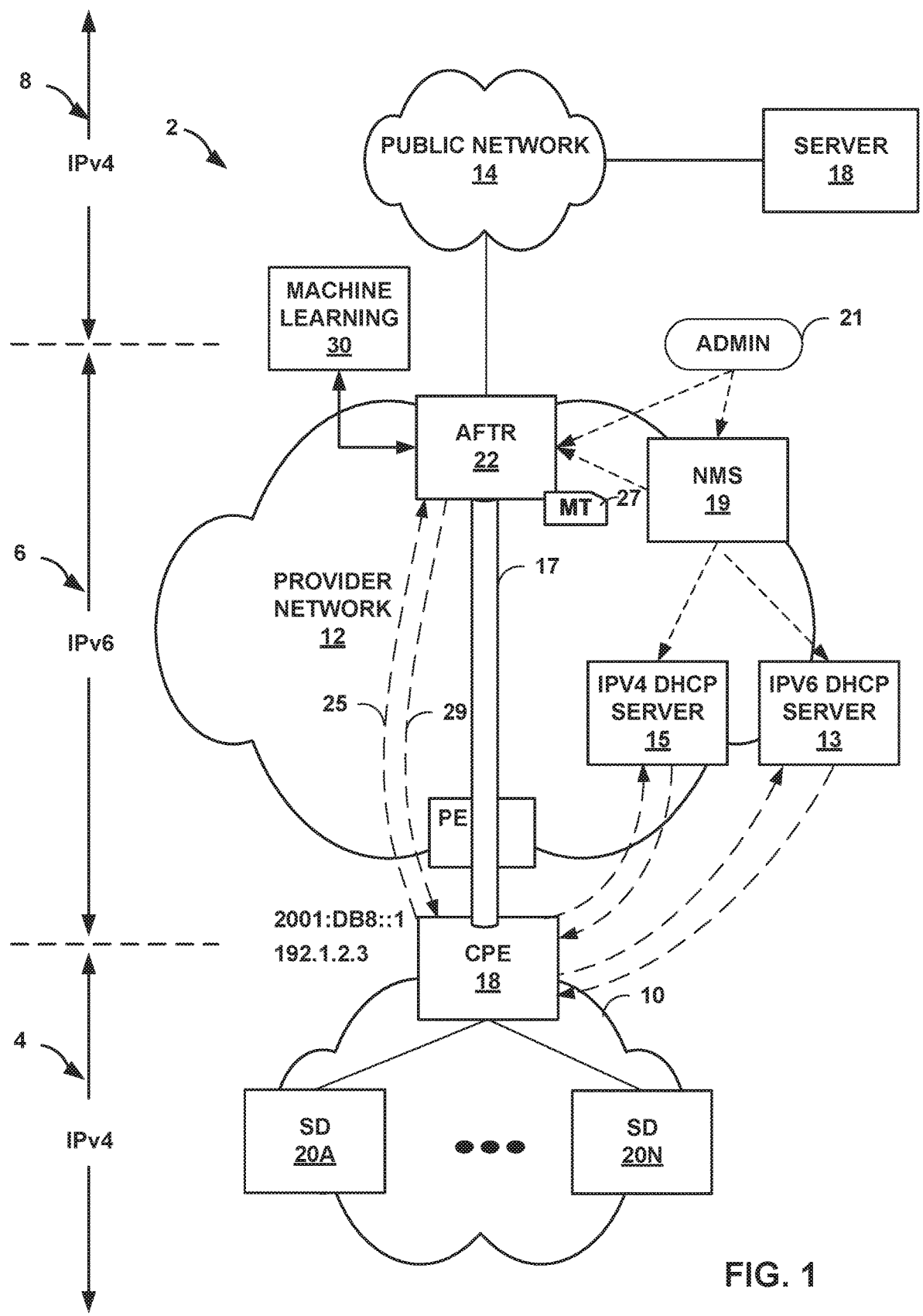
FIG. 1 is a block diagram illustrating an example network system having a CG-NAT network device according to the techniques of this disclosure.

FIG. 1 is a block diagram illustrating an example network system 2 that may implement the dynamic altering of otherwise static CG-NAT network device parameters according to the techniques described in this disclosure. As shown in FIG. 1, network system 2 includes subscriber network 10, service provider network 12 and public network 14. In the example of FIG. 1, service provider network 12 operates as a private network that provides packet-based network access to a customer having customer-premises equipment (CPE) 18 that services one or more subscriber devices (SD) 20A-20N (collectively, "subscriber devices 20) for that customer. Each network within network system 2 may operate in accordance with one or more network-layer protocol (i.e., layer three of the OSI model). As illustrated in FIG. 1, different segments of network system 2 operate in accordance with different network-layer protocols. For example, network segments 4 and 8 operate in accordance with Internet Protocol version 4 (IPv4) as described in RFC 791, entitled "Internet Protocol" to Jon Postel et al., September 1981. As another example, network segment 6 operates in accordance with Internet Protocol version 6 (IPv6) as described in request for comments (RFC) 2460, entitled "Internet Protocol, Version 6 (IPv6) Specification" to S. Deering et al., December 1998. While FIG. 1 illustrates a particular network layout, many other network layouts may use the techniques of this disclosure.

As illustrated in FIG. 1, subscriber network 10 and public network 14 send and receive network messages in accordance with IPv4. Provider network 12 sends and receives network messages in accordance with IPv6. While described as implementing IPv6, provider network 12 may also implement IPv4 or a combination of IPv4 and IPv6. Similarly, although described as implementing IPv4, subscriber network 10 and public network 14 may also implement IPv6 or a combination of IPv4 and IPv6.

Subscriber network 10 typically includes CPE 18 and one or more subscriber devices 20. CPE 18 may be a residential gateway by which the subscriber devices 20 connect to provider network 12 and thereby access public network 14. CPE 18 typically comprises a wireless router or other home networking device, such as a hub, a switch, a router, a cable modem, a digital subscriber line (DSL) modem or any other device that provides access or otherwise connects subscriber devices 20 to public network 14 or other wide area network (WAN). Typically, subscriber devices 20 are connected to CPE 18 via wired or wireless network protocols, such as Ethernet or 802.11g. Examples of subscriber devices 20 include personal computers, laptop computers, workstations, tablet computers, personal digital assistants (PDAs), wireless device, network-ready appliances, and the like.

Provider network 12 may represent a private network that is owned and operated by an Internet service provider (ISP)

to provide network access to one or more subscriber devices 20. As a result, provider network 12 may be referred to herein as a service provider (SP) network. Provider network 12 may connect to one or more customer networks (e.g., subscriber network 10). While the example network system 2 illustrated in FIG. 1 includes one provider network 12, other examples may include multiple provider networks 12.

Address Family Translation Router (AFTR) 22 of provider network 12 provides connectivity to public network 14. Public network 14 may comprise any set of one or more interconnected public networks, such as the Internet. Public network 14 may include other conventional network devices, such as routers, media gateways, switches, hubs, and network accelerators, to communicate data between subscriber devices 20 and network resources, such as server 20. Server 20 represents any device that provides one or more network resources accessible to subscriber devices 20. For example, server 20 may include email servers, domain controllers, web servers, print servers, printers, network copiers, gateways, intelligent switches, hubs, routers or other network access points or devices. AFTR 22 may comprise a layer two (L2) switch, a layer three (L3) router or another type of network device that facilitates the transfer of data within network system 2. In some examples, AFTR 22 may also perform bridging functions, firewall functions, intrusion detection functions, security functions, or other network functions. Further, although shown and described as providing L3 services, AFTR 22 may be any network element that provides services for other layers of the network stack. As one example, AFTR 22 may be a network router that integrates L2 and L3 services so as to provide L2 forwarding services as well as L3 routing functions. As shown in the example of FIG. 1, AFTR 22 is connected to provider network 12 and public network 14 and exchanges data between provider network 12 and public network 14.

CPE 18 and AFTR 22 are configured to tunnel packets through provider network 12, allowing the service provider to take advantage of IPv6 while supporting IPv4 customers and IPv4 Internet connectivity. CPE 18 located at a subscriber's premises acts as an ingress and egress for tunnel 17 that encapsulates IPv4 packets within IPv6 packets. That is, the IPv6 packets may be configured in accordance with a transitioning protocol, such as dual-stack lite (ds-lite) and may encapsulate IPv4 packets. In this case, IPv4-over-IPv6 tunnel 17 is commonly referred to as an "IPv4-in-IPv6 softwire" or "softwire" for short. According to the example of FIG. 1, CPE 18 is assigned both a public IPv6 network address and a public IPv4 address, and subscriber devices 20 are assigned private (e.g., not globally unique) IPv4 network addresses.

When implementing the ds-lite approach, CPE 17 and AFTR 22 cooperate to perform both tunneling functionality as well as network address translation functionality. That is, AFTR 22 controls CPE 18 to provide restricted CG-NAT locally within subscriber network 10, thereby implementing network address translation for the inbound and outbound packets in a manner that is deterministic and stateless for AFTR 22.

For example, CPE 18 is assigned an IPv6 (e.g., 2001: DB8::1) for use in tunneling traffic via tunnel 17 to AFTR 22. This may be assigned, for example, by IPv6 DHCP server 13. At this time, CPE 18 is also assigned a public IPv4 address (e.g., 192.1.2.3) for use within public network 13. For example, IPV6 DHCP server 13 may provide CPE 18 with an address of IPv4 DHCP server 15, which in turn may assign the IPv4 public address to CPE 18.

AFTR 22 may be provisioned with configuration parameters prior to going live, in other words being brought on-line to operate on subscriber packet flows. These parameters may include, for example, port block sizes, NAT mapping timeout values, NAT session inactivity timeout values, and max-session-per-subscriber values. For example, it is important to log every session in a CG-NAT environment due to security threats. By allocating ports to subscribers in blocks rather than individually, a CG-NAT network device may reduce syslog generation. The CG-NAT network device may reduce syslogs with block port allocation by a factor directly proportional to the block size when compared to allocating them individually. Therefore, the port block sizes parameters may important to the functioning of a network.

The port block sizes parameters are determined, for example by an administrator at an ISP, prior to the CG-NAT network device, e.g., AFTR 22, being provisioned. The port block sizes parameters are generally determined based upon an analysis of subscriber traffic patterns at various times over a limited time period. So the determination of the port block size parameters is dependent upon limited information and as a network evolves, that determination may become outdated. When parameters, such as a port block size parameter, become outdated, network efficiency and network device efficiency may be negatively impacted.

For example, if there are 10,000 CG-NAT ports and the port block size per subscriber is 1000, then ten subscribers will be allocated 1 port block each. Table 1 shows a situation in which ports are underutilized by subscribers with the static parameter of port block size being set at 1000.

TABLE 1

| Subscriber | Allocated Port Block Size | Number of Ports Utilized in the Port Block at Time "t" | Port Block Efficiency |
|---|---|---|---|
| S1 | 1000 | 500 | 50% |
| S2 | 1000 | 600 | 60% |
| S3 | 1000 | 300 | 30% |
| S4 | 1000 | 800 | 80% |
| S5 | 1000 | 900 | 90% |
| S6 | 1000 | 100 | 10% |
| S7 | 1000 | 200 | 20% |
| S8 | 1000 | 400 | 40% |
| S9 | 1000 | 700 | 70% |
| S10 | 1000 | 1000 | 100% |

As can be seen in Table 1, the port block size parameter of 1000 is highly inefficient in this example. The port block size parameter of 1000 may have been efficient when it was originally set, but in this example it no longer is efficient.

If a new subscriber, S11 enters the CG-NAT node, there are many ports available to be allocated to subscriber S11, but due to the inefficient parameter of port block size being 1000, subscriber S11 will not be served.

Another example in which port blocks are over utilized is shown in Table 2.

TABLE 2

| Subscriber | Allocated Port Block Size | Number of Ports Utilized in the Port Block at Time "t" | Number of Sessions Dropped |
|---|---|---|---|
| S1 | 1000 | 1200 | 200 |
| S2 | 1000 | 1100 | 100 |
| S3 | 1000 | 1300 | 300 |
| S4 | 1000 | 1050 | 50 |

TABLE 2-continued

| Subscriber | Allocated Port Block Size | Number of Ports Utilized in the Port Block at Time "t" | Number of Sessions Dropped |
|---|---|---|---|
| S5 | 1000 | 1150 | 150 |
| S6 | 1000 | 1250 | 250 |
| S7 | 1000 | 1075 | 75 |
| S8 | 1000 | 1025 | 25 |
| S9 | 1000 | 1225 | 225 |
| S10 | 1000 | 1175 | 175 |

In the example of Table 2, each of the subscribers have multiple sessions being dropped because the port block size parameter is too low. The port block size parameter may have been appropriate when the CG-NAT network device was provisioned, but in this example, it no longer is appropriate as user experience for each user may be impacted.

In accordance with aspects of the techniques of this disclosure, system 2 includes a machine learning device 30. Machine learning device 30 may be a physically separate computing device in communication with (e.g., coupled to) AFTR 22. Alternatively, machine learning device may be a part of AFTR 22, or be attached to provider network 12 or public network 14 in a manner so as to have access to AFTR 22. In another example, machine learning device 30 may be part of NMS 19 or a flow collector device, not shown in FIG. 1. Machine learning device 30 may monitor subscriber packet flows that may be affected by otherwise static parameters and apply a machine learned model to identify patterns in the monitored subscriber packet flows and dynamically alter at least one of the parameters based upon the patterns in the monitored subscriber packet flows.

In one example, NAT mapping timeout value parameters may be altered by machine learning device 30. NAT mapping timeout values define how much time NAT mappings remain after a session corresponding to that mapping times out. As used herein, NAT mapping timeout values refers to End-Point-Independent (EIM) mapping timeout values or Address-Pooling-Paired (APP) mapping timeout values. NAT mapping timeout values exist for efficiency reasons. For example, if a new session matches a mapping, the mapping can be reused, without having to allocate new resources, such as memory, which may save processing power and improve latency.

When the NAT mapping timeout value is a static parameter, it may impact network efficiency. For example, AFTR 22 may hold a CG-NAT resource because the NAT mapping timeout value has not been reached. The subscriber who previously was utilizing that NAT mapping may not be initiating a new session. In this case, the network is not operating efficiently because that resource could be allocated to another subscriber.

Machine learning device 30 could improve the efficiency of the network by dynamically altering the NAT mapping timeout value parameter during operation of AFTR 22. For example, machine learning device 30 may analyze patterns in subscriber packet flows, such as any new sessions reusing a mapping when the mapping is in a timeout state, the percentage of the total mappings that are reused, how many times a particular mapping moved to a timeout state and then was reused, what percentage of total mappings expired without being reused, the maximum time within a NAT mapping timeout in which a mapping was reused, among many others. For example, machine learning device 30 may apply a machine learned model to identify patterns in subscriber packet flows. Machine learning device 30 may then predict an optimal or more efficient NAT mapping timeout value and alter the NAT mapping timeout value in AFTR 22 to attempt to improve the efficiency of provider network 12. For example, if the NAT mapping timeout value was 180 seconds and machine learning device 30 found that no mappings where being reused after 120 seconds, machine learning device 30 may alter the NAT mapping timeout value in AFTR 22 to be 120 seconds. Similarly, machine learning device 30 may monitor subscriber packet flows for patterns in the subscriber packet flows and alter other parameters in AFTR 22, such as NAT session inactivity timeout values, max-session-per-subscriber, among others. For example, machine learning device 30 may generate altered parameters and dynamically modify existing configuration parameters stored in AFTR 22 by replacing existing configuration parameters with the altered parameters while AFTR 22 is live, e.g., still operating on subscriber packet flows. In another example, machine learning device 30 may generate altered parameters and send the altered parameters to AFTR 22 and AFTR 22 may dynamically modify the existing configuration parameters stored in AFTR 22 while AFTR 22 is live, e.g., still operating on subscriber packet flows. In either example, AFTR 22 may then operate on the subscriber packet flows based on the altered configuration parameters. In some examples, the altered parameters may be based on a time of day. For example, machine learning device may generate different NAT mapping timeout values for day or night or for peak hours and non-peak hours.

Figure 2:
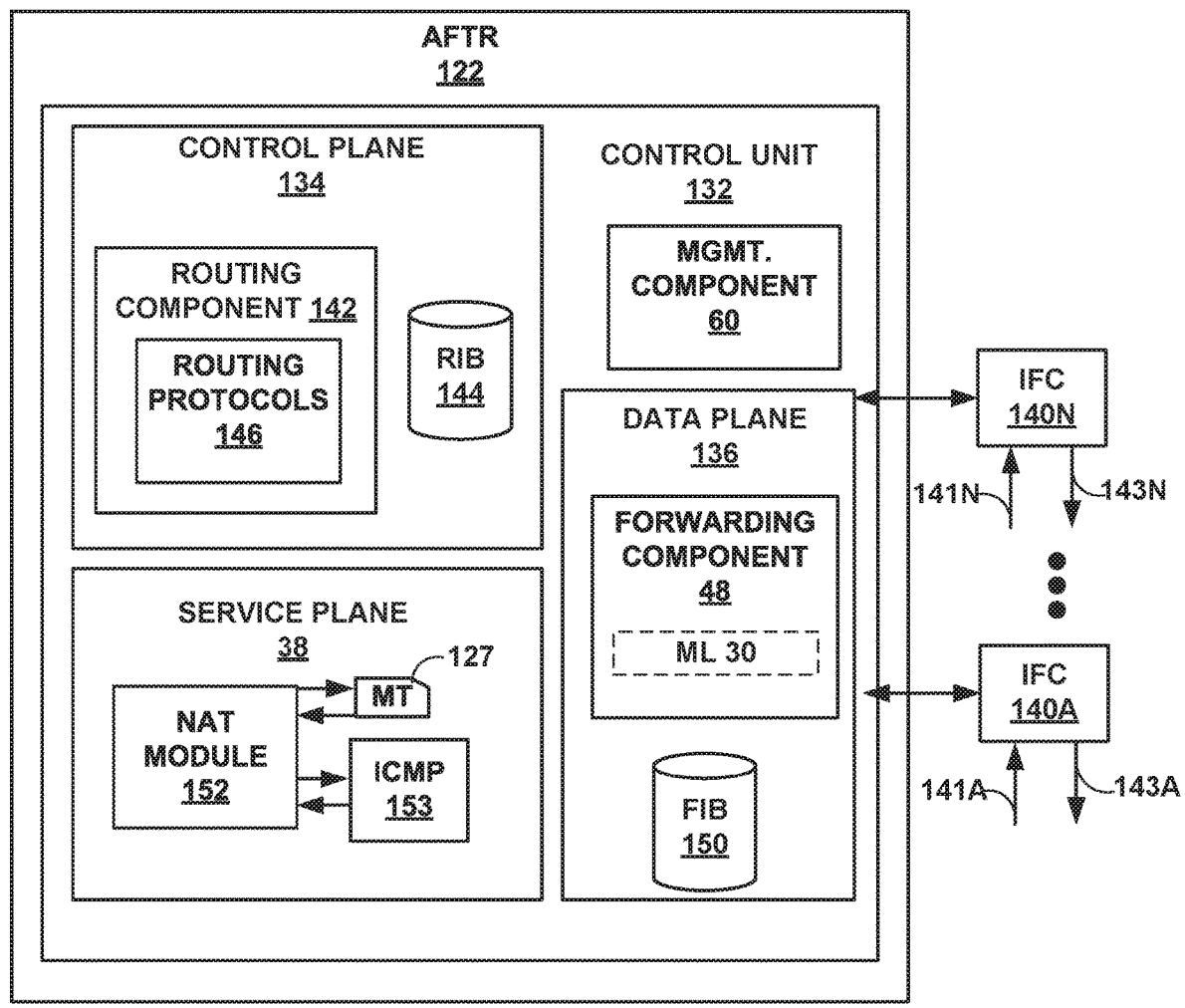
FIG. 2 is a block diagram illustrating an example CG-NAT network device that may implement the techniques of this disclosure.

FIG. 2 is a block diagram illustrating an example AFTR 122 that may implement the techniques of this disclosure. For purposes of illustration, AFTR 122 may be described below within the context of the example network system 2 of FIG. 1 and may represent AFTR 22. In this example, AFTR 122 includes control unit 132 and interface cards (IFCs) 140A-140N (collectively, "IFCs 140") that send and receive packet flows or network traffic via inbound network links 141A-141N (collectively, "inbound links 141") and outbound network links 143A-143N (collectively, "outbound links 143"). AFTR 122 typically include a chassis (not shown in the example of FIG. 2) having a number of slots for receiving a set of cards, including IFCs 140. Each card may be inserted into a corresponding slot of a chassis for communicably coupling the card to a control unit 132 via a bus, backplane, or other electrical communication mechanism. IFCs 140 are typically coupled to network links 141 via a number of interface ports (not shown), and send and receive transient network traffic as well control messages to and from control unit 132.

Control unit 132 may include one or more processors that execute software instructions, such as those used to define a software or computer program, stored to a computer-readable storage medium, such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 132 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 132 may also be divided into at least three logical or physical "planes" to include a first control or routing plane 134, a second data or forwarding plane 136, and a third service plane 138. That is, control unit 132 may implement three separate functionalities, e.g., the routing, forwarding and service functionalities, either logically, e.g., as separate software instances executing on the same set of hardware components, physically, e.g., as separate physical dedicated hardware components that either statically implement the functionality in hardware or dynamically execute software or a computer program to implement the functionality, or some combination of logical and physical implementations. Control unit 132 may also contain management component 60. In some examples, management component 60 may comprise a configuration management daemon.

A high-speed switch couples control plane 134, service plane 28 and, IFCs 140 to deliver data units and control messages among the elements. The switch may comprise an internal switch fabric or cross-bar, bus, or link, or combination thereof. Examples of high-speed multi-stage switch fabrics used as a forwarding plane to relay packets between units within a router are described in U.S. Pat. No. 8,050,559, entitled MULTI-CHASSIS ROUTER WITH MULTIPLEXED OPTICAL INTERCONNECTS and issued on Nov. 1, 2011. In some implementations, control plane 134 may logically implement service plane 138 in that service plane 138 is provided as a virtual service plane executing within control plane 134. In this respect, NAT module 152 may execute within either service plane 138 when a dedicated service plane 138 is implemented or within control plane 134 when service plane 138 executes as a virtualized service plane 138 in a virtual environment provided by control plane 134.

Control plane 134 of control unit 132 may provide the routing functionality of AFTR 122. In this respect, control plane 134 may represent hardware or a combination of hardware and software of control unit 132 that implements routing protocols 146 by which routing information stored within routing information base (RIB) 44 may be determined. The routing information may include information defining a topology of a network, such provider network 12. Routing component 142 of control plane 134 may resolve the topology defined by the routing information to select or determine one or more routes through provider network 12. Control plane 134 may then update data plane 136 with these routes, where data plane 36 maintains these routes as forwarding information stored within forwarding information base (FIB) 50. Forwarding or data plane 136 may include forwarding component 48, which may be implemented in hardware or a combination of hardware and software of control unit 132 that forwards network traffic in accordance with the forwarding information. Service plane 138 may represent hardware or a combination of hardware and software of control unit 132 responsible for providing and managing one or more services, such as a NAT service. RIB 144 and FIB 150 may each be stored in the form of one or more tables, databases, linked lists, radix trees, or other suitable data structure.

Service plane 138 provides an operating environment for executing service-related program code, including NAT module 152 and ICMP 153. For example, forwarding component 148 may direct certain types of packets to service plane 138 for processing prior to forwarding the packet in accordance with FIB 150. For example, FIB 150 may specify that certain packets need to be forwarded to a "next-hop" of a logical interface that corresponds to service plane 38. When a packet is received from CPE 18 and configured in accordance with the ds-lite approach, for example, the packet is structured as an IPv6 tunnel packet and includes an IPv6 source address that is set to the IPv6 address of CPE 18 and an IPv6 destination address that is set to the IPv6 address of AFTR 22. As such, forwarding component 148 forwards the IPv4 over IPv6 traffic to service plane 38 for processing by NAT module 152, which in turns provides ingress and egress operations as well as the stateless, deterministic NAT operations described herein.

For example, when processing an outbound IPv4 over IPv6 packet, NAT module 152 accesses per-subscriber mapping table 127 and verifies that the outer IPv6 source address is a valid address that is currently assigned to a CPE device 18. If not, tunnel module 162 drops the IPv6 packet. Otherwise, NAT module 152 removes the outer IPv6 header to decapsulate the inner IPv4 packet for further processing by NAT module 152. NAT module 152 then verifies that the inner IPv4 source address matches an entry in mapping table 127. If not, NAT module 152 drops the packet and invokes ICMP 153 to send back an ICMP "administratively prohibited" message. Otherwise, if the inner IPv4 source address matches an entry, NAT module 152 confirms that the inner IPv4 packet already NATed by CPE 18 complies with the port restrictions specified by per-subscriber mapping table 127 for the specific transport protocol being used. In the event the outbound IPv4 packet contains a source port number that violates the port restrictions for a given CPE, NAT module 152 drops the packet and invokes ICMP 153 to send back an ICMP "port restricted" message to the IPv6 source address of the packet. That is, NAT module 152 constructs the ICMP "port restricted" message to set field 92 with the original IPv6 headers and payload of the IPv6 packet that violated the port restrictions.

Similarly, NAT module 152 provides ingress functions for inbound IPv4 packets destined for CPE 22. For example, NAT module 152 verifies that inbound IPv4 packets received from public network 14 have destination IPv4 addresses that match an entry within mapping table 127 and have destination ports that fall within the restricted port range. NAT module 152 drops any inbound IPv4 packets outside of the IPv4 address and protocol range entries within mapping table 127.

As described above, a network device such as AFTR 122 may optionally include machine learning device 30 (shown in FIG. 2 in dashed lines). In some examples, machine learning device 30 may be located in the data plane 136, such as in a separate forwarding component, packet processor, or packet forwarding engine. In other examples, machine learning device 30 may be located in the control plane 134 or the service plane 38. Machine learning device 30 may collect historical data related to the subscriber packet flows from, for example, daemons or other software processes executing on control plane 134, data plane 136 and/or service plane 38, such as a routing protocol daemon. For example, machine learning device 30 may use an inter-chassis control protocol (ICCP) to communicate with the daemons. In the example of AFTR 122 not including machine learning device 30 and the machine learning device being on a computing device that is physically separate and distinct from AFTR 122, AFTR 122 may include a telemetry interface or other interface (not shown) using, for example, protocol buffers, NETCONF via SSH, or User Datagram Protocol (UDP) to communicate with machine learning device 30 to send collected data and to receive altered configuration parameters.

Machine learning device 30 may apply a machine-learned model to the collected data to predict altered (e.g., improved) configuration parameters for application to subscriber flows. Machine learning device 30 provides the altered configuration parameters to components of AFTR 122. In some examples, the machine learning device may apply the altered configuration parameters to control plane 134, data plane 136 and/or service plane 38. For example, the machine learning device communicates the altered configuration data be committed on AFTR 122 by communicating with the daemon responsible for configuration management in AFTR 122 (e.g., management component 60, a management daemon in control plane 134 or NAT module 152) to update stored NAT configuration data (not shown). The stored NAT configuration data may include management configuration data stored in the control plane 134 or NAT configuration data stored on a service card in service plane 38. In this manner, the machine learning device alters existing configuration parameters while AFTR 122 is live, e.g., operating on subscriber packet flows. AFTR 122 may then operate on the subscriber packet flows based on the altered configuration parameters. For example, in the case where the port block size parameter is 1000, machine learning device 30 may determine the port block size parameter of 1000 is inefficient and may apply an altered port block size parameter, for instance 800, to configuration data stored in, for example, control plane 134. Control plane 134 may then operate on subscriber packet flows based on the altered port block size of 800.

Figure 3:
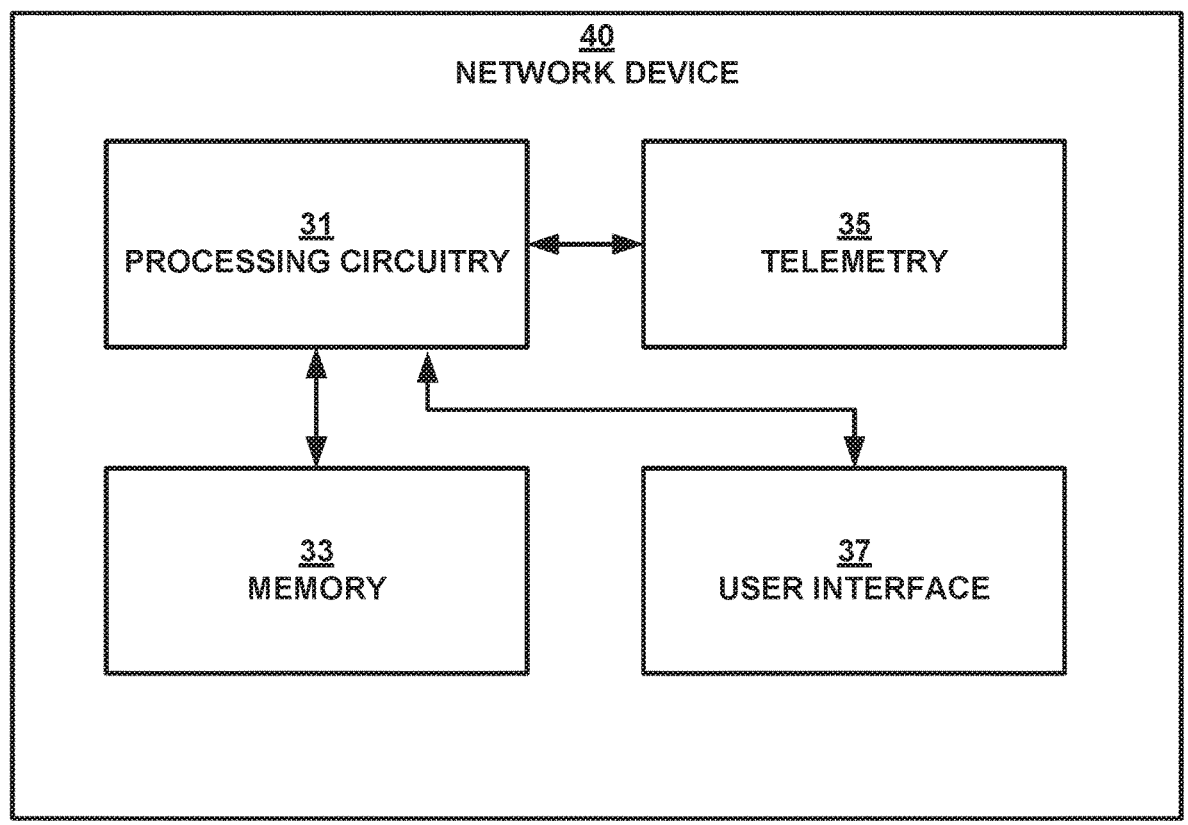
FIG. 3 is a block diagram illustrating an example network device that may implement the techniques of this disclosure.

FIG. 3 is a block diagram of a network device 40 capable of implementing machine learning device 30 according to techniques of this disclosure. As mentioned previously, machine learning device 30 may be a physically separate computing device or may alternatively be a part of a network device, such as for example AFTR 22, NMS 19 or a flow collector device. Network device 40 may include processing circuitry 31. Processing circuitry 31 may include one or more processors that are configured to implement functionality and/or process instructions for execution within network device 40. For example, processing circuitry 31 may include, for example, microprocessors, DSPs, ASICs, FPGAs, or equivalent discrete or integrated logic circuitry, or a combination of any of the foregoing devices or circuitry. Machine learning device may include memory 33 coupled to processing circuitry 31. Memory 33 may store instructions for execution by processing circuitry 31. In the case where network device 40 represents machine learning device 30, memory 33 may store a learned model used to identify patterns in monitored subscriber packet flows, data associated with the subscriber packet flows, and instructions enabling machine learning device 30 to dynamically alter parameters on network devices, such as a CG-NAT device (e.g., AFTR 22), a SD-WAN device, a flow collector or other network device. Machine learning algorithms that may be used by machine learning device 30 to determine the machine learned model may include kth nearest neighbor (KNN), linear discriminant analysis (LDA), Linear regression (LR), classification and regression tree (CART), Naïve Bayes (NB), or support vector machine (SVM), for example.

Network device 40 may include telemetry device 35 enabling network device 40 to send and receive data to and from other network devices. In the example where network device 40 represents machine learning device 30, telemetry device 35 may communicate with network devices to monitor subscriber packet flows and to alter parameters of the network devices. For example, with respect to AFTR 22, network device 40 may monitor port block usage by subscribers. If the machine learned model in memory 33 determines that the port block size parameter on AFTR 22 is inefficient, network device 40 may generate an altered port block size parameter and apply the altered parameter to AFTR 22 while AFTR 22 is live, e.g., still operating on subscriber packet flows. Alternatively, network device 40 may generate the altered port block size parameter and send the altered parameter to AFTR 22 and AFTR 22 may apply the altered port block size parameter to itself (AFTR 22) while AFTR 22 is still operating on subscriber packet flows. AFTR 22 may then operate on the subscriber packet flows based on the altered port block size parameter. Network device 40 may include a user interface 37, enabling a user to interact with network device 40.

Figure 4:
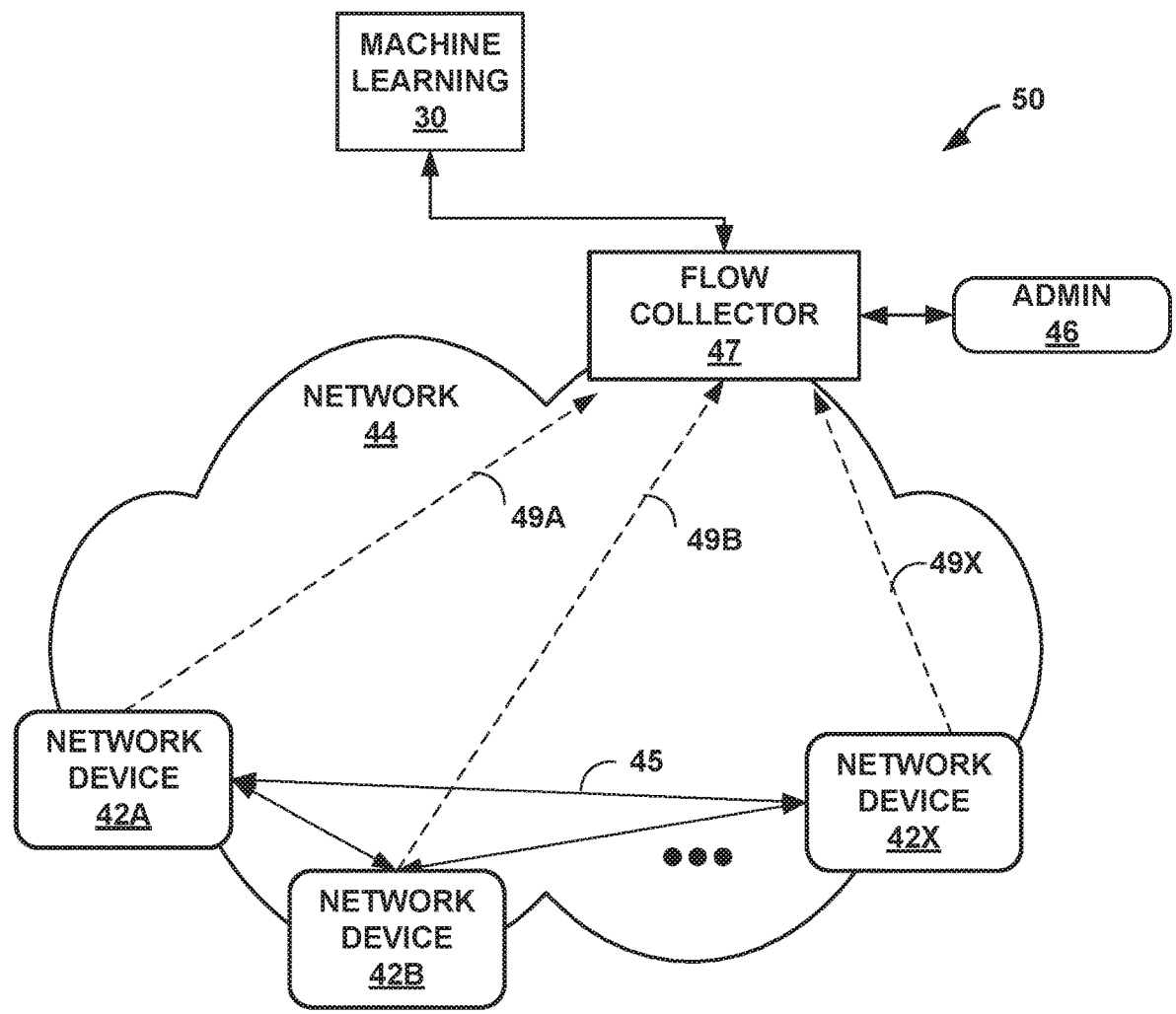
FIG. 4 is a block diagram illustrating an example network system having a flow collector network device according to the techniques of this disclosure.

FIG. 4 is a block diagram illustrating an example system 50 having a number of network devices 42A-42X ("network devices 42") in which machine learning device 30 may dynamically alter parameters associated with packet flow exports, in accordance with the techniques of this disclosure. As illustrated in FIG. 4, each network device 42 samples packet flows, and generates packet flow records and transmits the packet flow records to flow collector 47. An inactivity export timeout parameter and an activity export timeout parameter define when network devices 42A-42X transmit packet flow records to flow collector 47. Network devices 42 may comprise dedicated computers, specialized devices, or virtual machines providing network services, such as network routers, gateways, switches, firewalls, hubs, servers, VPN appliances, security network devices, routing services platform network devices or other network devices that forward or otherwise provide services to packet flows.

Network 44 may represent any type of packet-switched network, such as a service provider network, a customer network, an access network, a local area network (LAN), a wide area network (WAN) or combinations thereof. Moreover, network 44 may be formed by an interconnected group of autonomous systems, each representing an independent administrative domain having a variety of networked resources capable of packet-based communication. Alternatively, network 44 may correspond to a single autonomous system that may or may not be connected to other autonomous systems. In any case, network 44 may include a variety of network devices 42 coupled to one another via communication links.

Each packet flow within network 44, such as packet flow 45, may be identified by, for example, a unique set of characteristics. In one example, a "packet flow" (also known as "traffic flow" or "flow") can be defined by the six values used in a header of a packet, or "six-tuple," i.e., a source IP address, destination IP address, source port, destination port, protocol, and direction that are used to route packets through the physical network and a communication protocol. A set of one or more packet data units (PDUs) that match a particular flow entry represent a packet flow. Packet flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TP) connection, all PDUs sourced by a particular MAC address or IP address, all PDUs having the same VLAN tag, or all PDUs received at the same switch port. The term "packet" is used herein to generally describe a unit of data communicated between network devices in conformance with a packet-based communication protocol. The techniques of this disclosure are readily applicable to systems implementing any of a variety of protocols, such as the Transmission Control Protocol (TCP), the User Datagram Protocol (UDP), the Internet Protocol (IP), Asynchronous Transfer Mode, Frame Relay, and the like. Accordingly, "packet" is used to encompass any such unit of data, and may be interchanged with the term "cell," or other similar terms used in such protocols to describe a unit of data communicated between resources within the network.

Network devices 42 may include one or more traffic flow modules (not shown in FIG. 4) that accumulate flow statistics for traffic within network 44. In some examples, the traffic flow modules may accumulate flow statistics for traffic across networks. More specifically, network devices 42 receive or otherwise capture packets (e.g., sample packets) from one or more links within network 44, and compute flow statistics indicative of packet flows (e.g., packet flow 45) over the links. As network devices 42 receive sampled packets, the traffic flow modules within the network devices update counters and compute statistics for the sampled packets flows based on the specific packets received for respective packet flows. For example, the traffic flow modules within network devices 42 may maintain, for each sampled packet flow, a packet count, byte count, source IP address, destination IP address, next hop IP address, input interface information, output interface information, total octets sent, flow start time, flow end time, source and destination port numbers, TCP flags, IP type of service, originating AS, source address prefix mask bits, destination address prefix mask bits, or the like, for each sampled packet flow. Network devices 42 may sample packet flows 45 and output flow records 49A-49X ("flow records 49") to flow collector 47 to communicate the flow statistics compiled by each of network devices 42.

The phrase "traffic flow record" is used herein to describe a packet or set of packets having payloads that specifically includes traffic flow information. The traffic flow modules within each of network devices 42 may provide internal accounting capabilities for maintaining flow statistics for all of the packets received by network devices 42. Additionally, other routing information within packets may readily be used to define the packet flows for which flow statistics are maintained, such as MPLS labels, VPN labels, Class of Service (CoS) information, and the like. In this manner, statistics for particularized sampled packet flows can be maintained to a level of granularity desired for effective traffic analysis.

As noted above, network devices 42 periodically communicate traffic flow records 49 to flow collector 47. Each of the traffic flow records 49 include traffic flow information accumulated by the respective network device, such as a number of packets, a number of bytes, a time of capturing a first packet for the flow, a time of capturing a most recent packet for the flow, an incoming interface, an outgoing interface, a source/destination network mask, a source/destination Autonomous System (AS) number, or the like. Flow collector 47 receives traffic flow records 49 sent by network devices 42 and updates an accounting system or other database based on the received traffic flow records. That is, flow collector 47 receives traffic flow records 49 from network devices 42 and stores the traffic flow information carried by the traffic flow records within a database or other suitable data structure. In addition, flow collector 47 or other analysis tools may analyze the received traffic flow records 49 to aid system administrator 46 ("Admin" 46) to support network management such as traffic engineering purposes, network planning, usage-based pricing, and network security. Network device 40 of FIG. 3 may represent flow collector 47 or any of network devices 42.

Machine learning device 30 may be coupled to flow collector 47. For example, machine learning device 30 may be part of a security appliance device, such as a firewall device, having virtualized network functions (VNF) executing thereon, where one of the VNFs comprises a machine learning application or software process. Alternatively, machine learning device 30 may be coupled to network devices 42 or be otherwise coupled to network 44 in a manner in which machine learning device 30 may monitor subscriber packet flows for patterns and may alter otherwise static parameters in network devices such as flow collector 47 and network devices 42. In other examples, machine learning device 30 may be part of flow collector 47 or of any of network devices 42.

A flow collector device, such as flow collector 47, or network devices 42, may be configured with static parameters for inactivity export timeout and activity export timeout. The inactivity export timeout parameter controls when a flow record containing data about the flow is exported to a flow collector. For example, if the inactivity export timeout is 60 seconds, then if a flow is inactive for 60 seconds, the flow times out and a flow record is exported to flow collector 47. The activity export timeout parameter controls the interval at which flow records are exported to the flow collector regarding an active flow. For example, if an activity export timeout value is 180 seconds and a flow is active for 540 seconds, flow records regarding the active flow will be exported at 180 seconds, 360 seconds and 540 seconds. The flow collector decodes the flow records and thus has visibility into traffic flowing through the device which exported the flow records.

Machine learning device 30 may analyze patterns in the subscriber packet flows from the flow records or otherwise and, based on application of a machine learned model, alter the inactivity export timeout parameter and/or the activity export timeout parameter in the network devices 42 or in flow collector 47 based upon patterns in the subscriber packet flows. For example, if a number of flow activity export timeout and inactivity export timeout values have been historically tried, the historical data could be provided to machine learning device 30. Table 3 below represents an example of historical data and the timeout values are in seconds.

TABLE 3

| Export Inactivity Timeout | Export Activity Timeout | CPU Load (%) |
|---|---|---|
| 30 | 60 | 40 |
| 60 | 120 | 30 |
| 90 | 180 | 20 |
| 60 | 30 | 20 |
| 90 | 45 | 30 |
| 120 | 60 | 40 |

Machine learning device 30 may apply the KNN algorithm to predict CPU load for other values for export inactivity timeout or export activity timeout. A Euclidean distance formula may be used $$\text{Euclidean Distance}, D = \Sigma_{i=1}^{n}(x_i - y_i)^2$$

An example where machine learning device 30 may attempt to predict CPU load for a value of export inactivity timeout of 180 seconds and export activity timeout of 180 seconds based on Euclidean distance is shown in Table 4.

TABLE 4

| Export Inactivity Timeout | Export Activity Timeout | CPU Load (%) | Euclidean Distance |
|---|---|---|---|
| 30 | 60 | 40 | 192.0937271 |
| 60 | 120 | 30 | 134.1640786 |
| 90 | 180 | 20 | 90 |
| 60 | 30 | 20 | 192.0937271 |
| 90 | 45 | 30 | 162.2498074 |
| 120 | 60 | 40 | 134.1640786 |

Row 1 was calculated as follows $D=\sqrt{[(180-30)^2+(180-60)^2]}=192.0937271$.

The data points may then be ranked based on the closest or nearest neighbors as shown in Table 5.

TABLE 5

| Export Inactivity Timeout | Export Activity Timeout | CPU Load (%) | Euclidean Distance | Rank |
|---|---|---|---|---|
| 30 | 60 | 40 | 192.0937271 | 6 |
| 60 | 120 | 30 | 134.1640786 | 2 |
| 90 | 180 | 20 | 90 | 1 |
| 60 | 30 | 20 | 192.0937271 | 5 |
| 90 | 45 | 30 | 162.2498074 | 4 |
| 120 | 60 | 40 | 134.1640786 | 3 |

So the CPU load with an export inactivity timeout of 180 seconds and an export activity timeout of 180 seconds would be around 20% based on the closest or nearest neighbor which is ranked 1. The larger the data set, the better the prediction may be.

Another example using a linear regression machine learning algorithm is now provided. Simple linear regression is a type of regression analysis where the number of independent variables is one and there is a linear relationship between the independent (x) and dependent (y) variable. Based on given data points, machine learning device 30 may determine a line that models the data points. The line may be modeled by the linear equation below.

$$y=a\_0+a\_1*x$$

The linear regression algorithm attempts to find the best values for a_0 and a_1. For example, using the values from Table 3, y may be either export activity timeout or export inactivity timeout and x is the CPU load.

Export Inactivity Timeout=$a\_0+a\_1*$CPU Load

Export Activity Timeout=$a\_0=a\_1*$CPU Load

Machine learning device 30 may calculate the linear equations above to find the CPU load with either an export activity timeout or export inactivity timeout of 180 seconds. Machine learning device 30 may attempt to find optimal or more efficient values for export inactivity timeout and export activity timeout by comparing both equations.

Machine learning device 30 may communicate via a telemetry interface with network devices 42 or flow collector 47 to monitor subscriber packet flows. Machine learning device 30 may utilize, for example, protocol buffers, NETCONF, or User Datagram Protocol (UDP) to communicate with a telemetry interface on the network device or flow collector, wherein the telemetry interface obtains the necessary data (e.g., flow records) from the daemons and provides altered configuration parameters to the daemons. In some examples, machine learning device 30 may generate the altered configuration parameters and apply the altered configuration parameters to network devices 42 or flow collector 47. In other examples, machine learning device 30 may generate the altered configuration parameters and send the altered configuration parameters to network devices 42 or flow collector 47 and network devices 42 or flow collector 47 may apply the altered configuration parameters to themselves (network devices 42 or flow collector 47). Network devices 42 or flow collector 47 may then operate on subscriber packet flows based on the altered configuration parameters. For example, if the configured inactivity export timeout and activity export timeout parameters are too low, a large amount of data will be exported putting a high load on the flow exporter and the flow collector. Machine learning device 30 may determine based on application of a machine learned model that the inactivity export timeout value and the activity export timeout value should be raised and may raise them accordingly. If the configured inactivity export timeout and activity export timeout parameters are too high, machine learning device 30 may determine based on application of the machine learned model that the inactivity export timeout value and the activity export timeout value are too high and lower them accordingly.

In another example, network devices such as security network devices and routing service network devices may also be configured with static parameters such as inactivity timeout parameters. Network device 40 of FIG. 3 may represent a security network device or a routing service network device.

Flows are basic elements for network devices such as security network devices and routing services platform network devices. New flows occupy memory. With a fixed amount of memory, flow creation influences the scalability of security network devices and routing services platforms. Different inactivity timeout parameters may exist for different flows of different applications. For example, an inactivity timeout parameter for Active FTP may be 1800 seconds, while the inactivity timeout parameter for SIP may be 3600 seconds.

In a case where 1000 SIP flows are created and only 100 are timing out inactively, machine learning device 30 may analyze the subscriber packet flows by applying a machine learned model to flow records from flow collector 47 and determine based on application of the machine learned model that none of the 100 that timed out inactively are reused after 1800 seconds. In this case, machine learning device 30 may alter the SIP inactivity timeout parameter in the security network device or the routing services platform network device, which may be represented by any of network devices 42, to 1800 seconds. By changing the SIP inactivity timeout parameter in this example, machine learning device may clear memory occupied by the 100 SIP sessions to improve memory allocation in the network.

In another example, in which only 90 of the 100 SIP sessions which are inactively timing out are not being refreshed after 1800 seconds, a weighting may be added to the machine learned model in machine learning device 30. In this example, 90 percent of the SIP sessions are not being refreshed after 1800 seconds after inactively timing out. The machine learned model in machine learning device 30 may apply the weighting such that if more than 90 percent of the SIP sessions are not being refreshed after 1800 seconds after inactively timing out, then machine learning device 30 may change the SIP inactivity timeout parameter in the security network device or the routing services platform network device.

Figure 5:
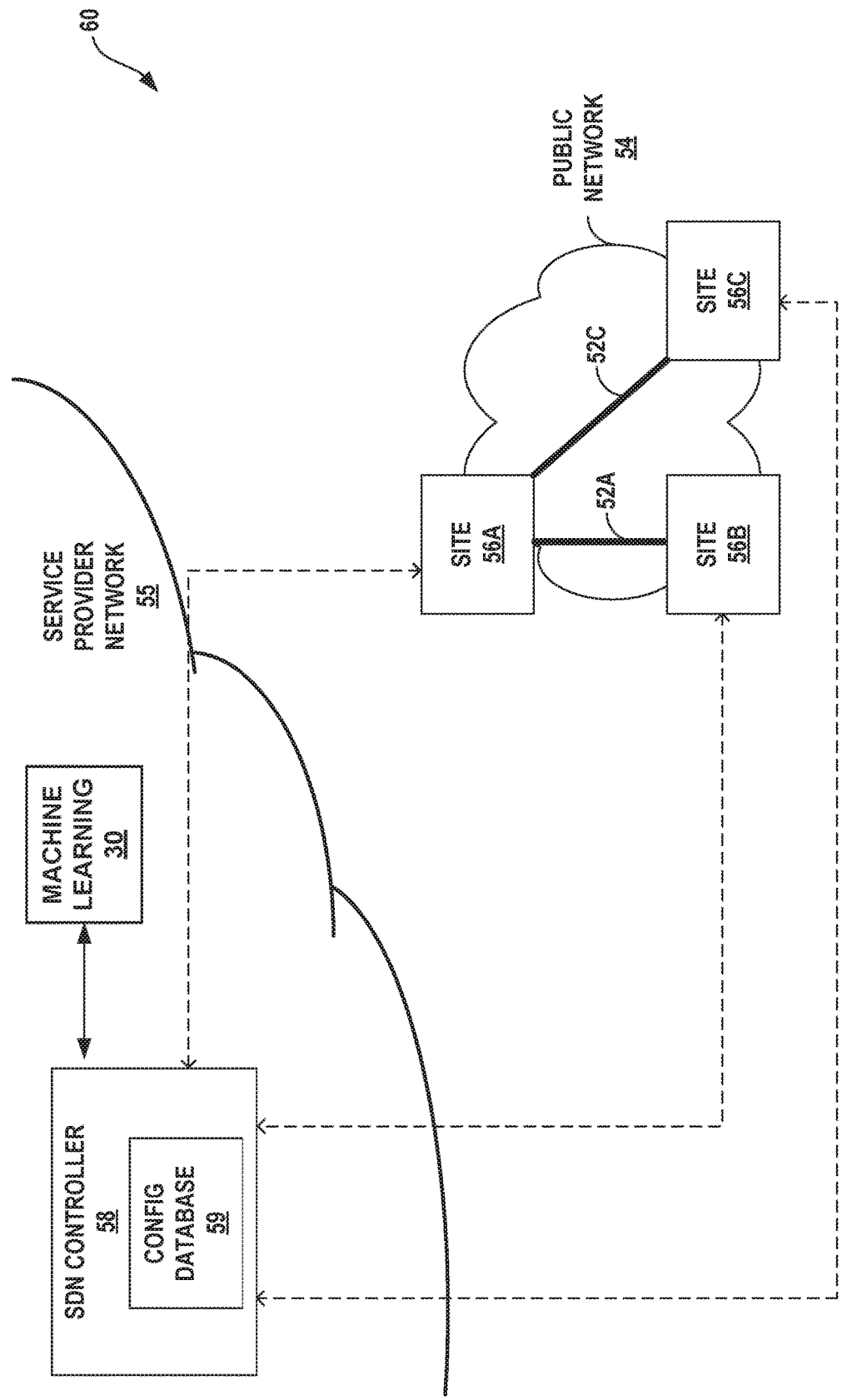
FIG. 5 is a block diagram illustrating an example SD-WAN network system according to the techniques of this disclosure.

FIG. 5 is a block diagram illustrating a SD-WAN network which may implement dynamic altering of otherwise static parameters, according to techniques of this disclosure. In a full mesh topology, SDN controller 58 (e.g., central controller or cloud service orchestrator (CSO)) would configure the full mesh tunnels by configuring each site with overlay tunnels to all other sites. In such cases, the number of such tunnels created are O(N) on each site, and SDN controller 58 would create such tunnels for every end-point, thereby having a provisioning and monitoring computation of O(N^2). Each site also has a redundant connection to all other sites by creating multiple tunnels, a factor of k, typically from 2 to 9. A dynamic full mesh provides for on-demand tunnels so that each site is not continually loaded with a full set of tunnels to each other site.

In FIG. 5, sites 56A-56C ("sites 56") are interconnected via links and network devices public network 54. That is, each of sites 56 can communicate with each other of sites 56 via public network. In some cases, sites 56A-56C may have alternatively, or additional, have connections via service provider network 55. In some examples, sites 56 may be configured in a hub-and-spoke configuration.

In this example, site 56A is a hub and sites 56B and 56C are spokes. As sites 56A-56C are already established in public network 54, SDN controller 58 may have computed, or may be in the process of computing, configuration data for overlay tunnels between any pair of sites 56A-56C. SDN controller 58 stores this configuration data in configuration database 59. If, at any point in the future, SDN controller 58 determines that certain policies (which may be defined by otherwise static parameters discussed below) have been met where overlay tunnels should be created or deleted between any pair of site 56A-56C, SDN controller 58 may retrieve the configuration parameters corresponding to the pair of sites and push the configuration parameters directly to each site in the pair to create or delete tunnels therebetween.

An SD-WAN network device, such as SDN controller 58, may be configured with static parameters such as a create threshold and a delete threshold. The create threshold is a threshold defining when new tunnels should be created between two sites. For example, if traffic between two sites exceeds the create threshold, SDN controller 58 may dynamically create new tunnels between the two sites. The delete threshold is a threshold defining when existing tunnels should be deleted between two sites. For example, when traffic falls below the threshold, the SDN controller 58 may dynamically delete tunnels between the two sites.

In one example, the create threshold may be 50 closed sessions and the delete threshold may be 20 closed sessions. In this example, if the number of closed sessions exceeds 50, SDN controller 58 may create new site-to-site tunnels and if the number of closed sessions is less than 20, SDN controller 58 may delete existing site-to-site tunnels.

Machine learning device 30 may be coupled to an SD-WAN network device, such as SDN controller 58. Alternatively, machine learning device 30 may be part of SDN controller 58. In other examples, machine learning device 30 may be coupled to service provider network 55 or public network 54 in a manner in which machine learning device may monitor subscriber packet flows in the SD-WAN for patterns and alter parameters in network devices coupled to the SD-WAN. Machine learning device 30 may monitor subscriber packet flows for patterns and alter the create threshold parameter and the delete threshold parameter based on the patterns in the subscriber packet flows. For example, machine learning device may sessions closed between a pair of sites, load on hubs, such as 56A, or on intermediate interconnecting devices (not shown). For example, if the create threshold is reached and the load on the two sites, e.g., sites 56A and 56B is low, machine learning device 30 may increase the create threshold on SDN controller 58. That way SDN controller 58 may avoid creating new site-to-site tunnels and save some processing power. In another example, if the delete threshold is reached and the load on the two sites, e.g., sites 56A and 56B is high, machine learning device 30 may decrease the delete threshold on SDN controller 58 and SDN controller 58 may avoid deleting new site-to-site tunnels and save some processing power.

In other examples, SDN controller 58 may have specific APPQoE SLA parameters. Machine learning device 30 may monitor subscriber packet flows associated with those APPQoE SLA parameters and alter those APPQoE SLA parameters based on the monitored subscribe packet flows in an attempt to improve network efficiency or SLA compliance.

In other examples, SDN controller 58 may have APPQoE probe interval parameters such as active probes interval and probe count. Machine learning device 30 may monitor subscriber packet flows associated with those APPQoE probe interval parameters and alter those APPQoE probe interval parameters based on the monitored subscribe packet flows in an attempt to improve network efficiency.

Figure 6:
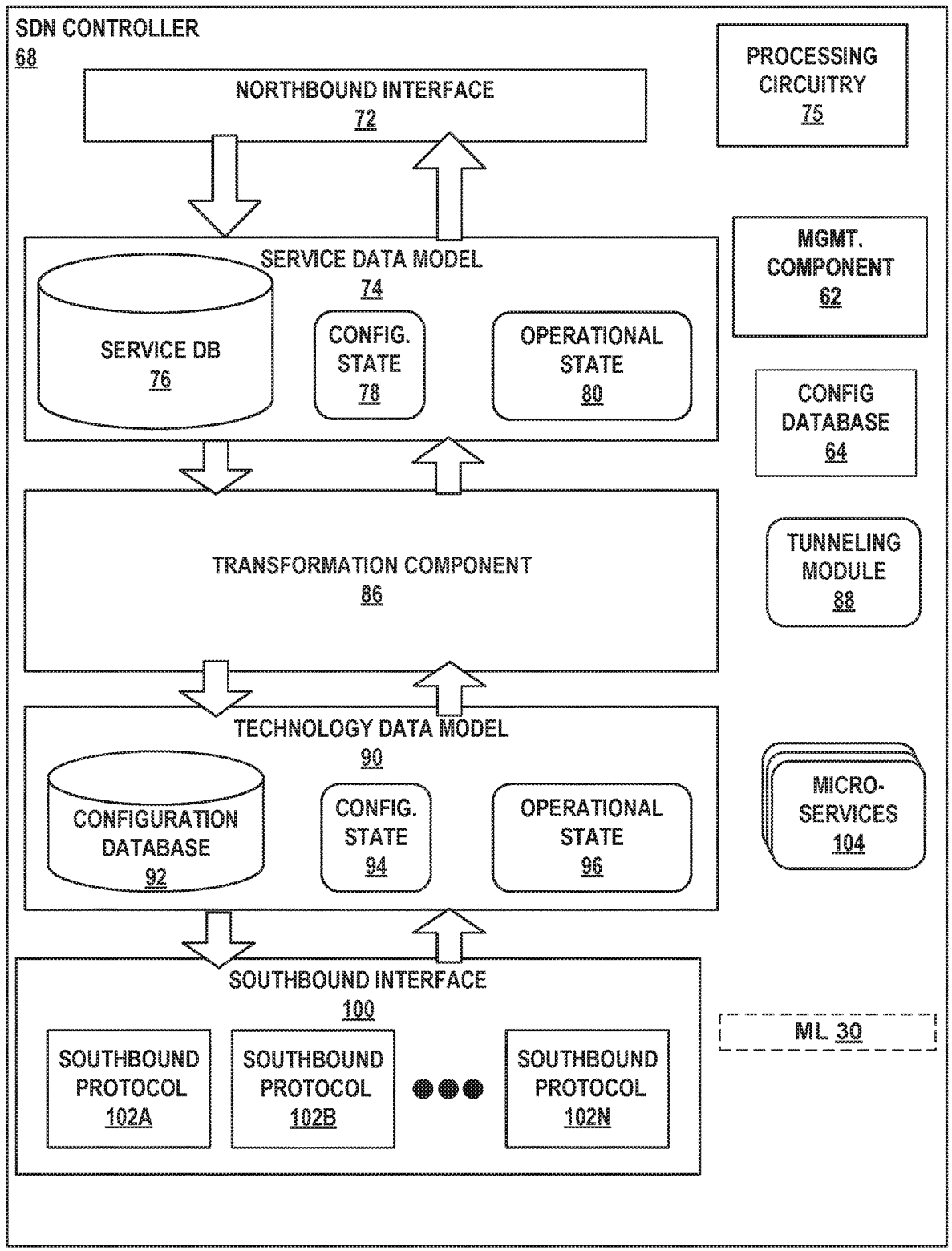
FIG. 6 is a block diagram illustrating an example SD-WAN network device that may implement the techniques of this disclosure.

FIG. 6 is a block diagram illustrating an example instance of software-defined networking (SDN) controller 68, in accordance with one or more techniques described in this disclosure. SDN controller 68 is a logically centralized but in some cases physically distributed controller for a network that may be configured to manage configurations of one or more network devices, such as servers, switches, and gateway devices. SDN controller 68 of FIG. 6 may represent an example instance of SDN controller 58 of FIG. 5.

SDN controller 68 includes processing circuitry 75. Processing circuitry 75 may include one or more processors that are configured to implement functionality and/or process instructions for execution within SDN controller 68. For example, processing circuitry 75 may include, for example, microprocessors, DSPs, ASICs, FPGAs, or equivalent discrete or integrated logic circuitry, or a combination of any of the foregoing devices or circuitry. SDN controller 68 may also include management component 62. In some examples, management component 62 may comprise a configuration management daemon.

SDN controller 68 presents a northbound interface 72 that interfaces with an orchestrator, administrator, or other entity to install configuration state using a high-level service configuration data model, e.g., service data model 74. More specifically, northbound interface 72 that may be invoked to modify configuration state 78 ("config. state 78") or extract operational state 80 of the SDN controller 68 that is descriptive of the service data model 74. Northbound interface 72 may be used for integration with an orchestration system such as OpenStack; northbound interface 72 may also or alternatively be used by other applications or the operator's Operations Support Systems (OSS)/Business Support Systems (BSS). Northbound interface 72 may in some cases present a RESTful Application Programming Interface (API).

Service database 76 stores objects that represent instantiated services within a formal service data model 74. The formal service data model 74 is a high-level service configuration data model used to describe the services that need to be implemented; each high-level service data model has an associated low-level device configuration data model, e.g., technology data model 90, that describes how those services need to be implemented. Each data model comprises of a set of objects, their capabilities, and the relationships between them.

Transformation component 86 transforms the service objects in service database 76 from the high-level service data model 74 to corresponding lower-level objects in the technology data model 90. Transformation component 86 may include a schema transformer that converts high-level concepts into low-level objects that can be implemented by the network. For instance, the schema transformer allocates one or more routing-instance objects for a virtual-network. In this sense, transformation component 86 operates as a compiler to transform the service data model 74 to the technology data model 90. That is, transformation component 86 may "map" the service data model 74 to the technology data model 90 to describe how the services described in the high-level service data model are to be implemented. Whereas the high-level service data model 74 describes services previously requested and instantiated or being processed for eventual instantiation with the network segment under control of SDN controller 68, the low-level technology data model 90 describes how those services are implemented or are to be implemented within the network, as represented in configuration database 92.

Configuration database 92 may include, for example, one or more objects that describe a tunnel, data center interconnect, or traffic engineered label switched path, that at least partially implements a service in service database 76. The technology data model 90 includes configuration state 94 that describes respective configurations of the network elements (e.g., routing instances and forwarding policy) as well as operational state 96 that describes respective operational characteristics of the network elements, such as load, available bandwidth, etc.

Put another way, the high-level service data model 74 describes the desired state of the network under the control of SDN controller 68 at a very high level of abstraction, using objects that map directly to services provided to end users—for example, a virtual network (e.g., a virtual overlay network), a connectivity policy (e.g., connectivity between workloads and endpoints such as VMs or bare metal servers), a security policy, and SD-WAN on-demand policies. The low-level technology data model 90, on the other hand, describes the desired state of the network at a very low level of abstraction, using objects that map to specific network protocol constructs (e.g., routing instances, routing sessions (e.g., BGP session), routes, overlay tunnels, etc.).

Southbound interface 100 executes one or more southbound protocols 102A-102N (collectively, "southbound protocols 102") with which SDN controller 68 may obtain configuration state 94 and operational state 96 from and inject configuration state 94 and operational state 96 into a network segment under the control of SDN controller 68, where configuration state 94 and operational state 96 store objects intelligible to southbound protocols 102 and mapped to constructs of southbound protocols 102. For example, SDN controller 68 may include an Interface to Metadata Access Points (IF-MAP) server that provides a southbound API to push computed low-level configuration data to a control unit/node that implements a logically centralized portion of the control plane. In this way, SDN controller 68 may make the state of the network under control of SDN controller 68 match the desired state of the network as received by SDN controller 68 via northbound interface 72 and represented by service data model 74.

Southbound protocols 102 may include protocols for path and tunnel provisioning, topology discovery, traffic monitoring, and so forth. For example, southbound protocols 102 may include MP-BGP or IP VPN to listen for routing information exchanged by network devices. Southbound protocols 102 may also include protocols to control network devices in data centers or service provider networks or enterprise networks, such protocols include for instance JSON or JSON-RPC and/or NETCONF/YANG. Southbound protocols 102 may further include other protocols such as Path Computation Element (PCE) Communication Protocol (PCEP), Open Shortest Path First with Traffic Engineering extensions (OSPF-TE), Intermediate System to Intermediate System with Traffic Engineering extensions (ISIS-TE), BGP Link State (BGP-LS), Interface to the Routing System (I2RS) protocols, CLIs for the network elements, and SNMP.

Tunneling module 88, also known as the tenant site and service management (TSSM) microservice, has the ultimate authority to trigger the creation and deletion of on-demand VPN tunnels between a pair of sites, if the create and delete thresholds respectively are met. Tunneling module 88, in turns, interacts with other microservices 104 before triggering the on-demand full mesh creation. Microservices 104 includes a fault management and performance management (FMPM) microservice, which may receive and process the create and delete dynamic full mesh notifications, as well as monitor the new over the top (OTT) links. Microservices 104 may also include the HAM microservice, which may model and create OTT links. Microservices 104 may also include the intent-based policy and service level agreement management (PSLAM) microservice, which may compute the SD-WAN policy configurations needed over the newly created OTT links, as per the configured SD-WAN policies. Microservices 104 also includes the resource management (RM) microservice, which may activate the VPN routing.

Conventionally, once a create or delete dynamic full mesh notification has been received from the FMPM microservice, tunneling module 108 may, upon interacting with the above mentioned microservices 104, compute the complete configuration which needs to be committed on both the involved sites, and also updates the SDN controller 68 internal states. Once tunneling module 88 computes the configuration, this configuration is pushed onto both of the sites, which will lead to full mesh tunnel creation between the corresponding pair of sites.

As described above, a network device such as SDN controller 68 may include machine learning device 30 (shown in FIG. 6 in dashed lines). Machine learning device 30 may collect data related to the subscriber packet flows from, for example, daemons located in service data model 74 and/or the technology data model 90. In some examples, machine learning device may apply the altered configuration parameters to, e.g., configuration database 64, service database 76 and/or configuration database 92, thereby altering existing configuration parameters while SDN controller 68 is live, e.g., actively operating as an SD-WAN orchestrator for SD-WAN devices. SDN controller 68 may then operate as an SD-WAN orchestrator based on the altered configuration parameters. For example, machine learning device may communicate the altered configuration data be committed on SDN controller 68 by communicating with the daemon responsible for configuration management in SDN controller 68 (e.g., management component 62) to update stored configuration data in configuration database 64, for example. For example, in the case where the create threshold parameter is 50 closed sessions on SDN controller 68, machine learning device 30 may determine based on application of a machine learned model the create threshold parameter of 50 closed sessions is inefficient and may apply an altered create threshold parameter of, for instance 70 closed sessions, to, for example, configuration database 64. SDN controller 68 may then operate on subscriber packet flows based on the altered create threshold of 70 closed sessions.

Figure 7:
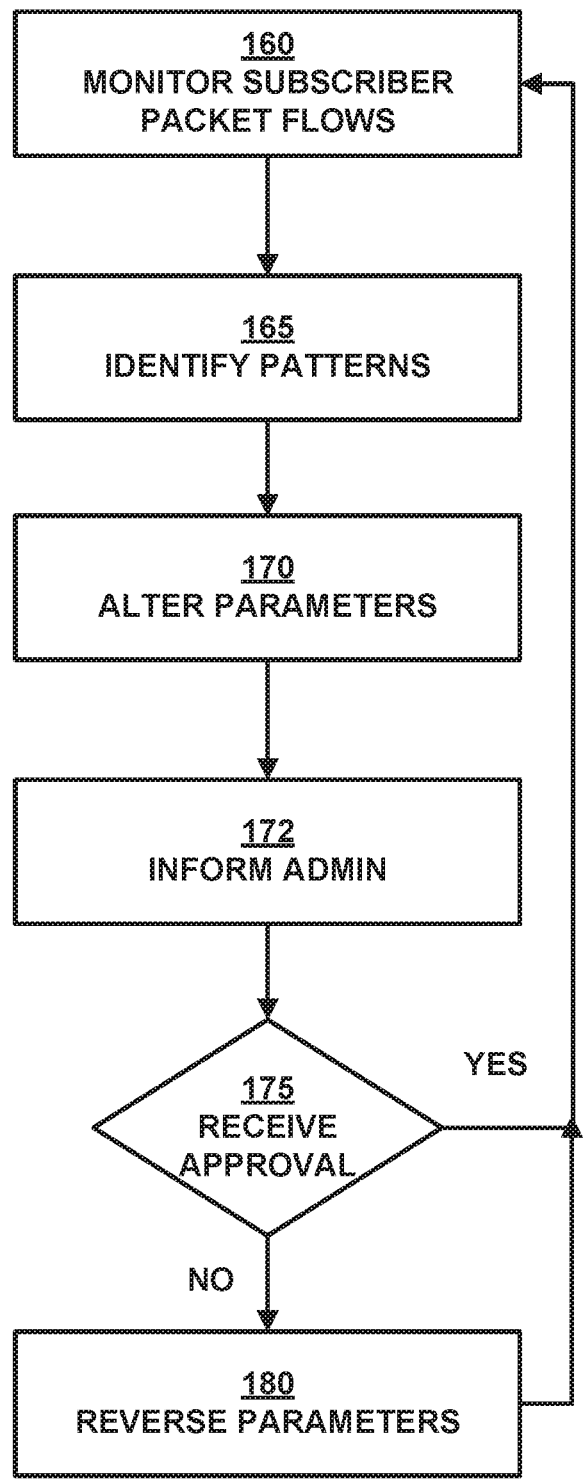
FIG. 7 is a flow diagram illustrating the dynamic altering of static parameters on a live network device according to the techniques of this disclosure.

FIG. 7 is a flow diagram illustrating techniques according to this disclosure. Machine learning device 30 may monitor subscriber packet flows (160). Machine learning device may monitor subscriber packet flows by receiving or obtaining data related to the subscriber packet flows from a network device(s) or by monitoring the subscriber packet flows directly. Machine learning device 30 may apply a machine learned model to identify patterns in the subscriber packet flows (165). Machine learning device 30 may then alter parameters on a network device, such as AFTR 22, any of network devices 42, flow collector 47, SDN controller 58 or other network device based upon the patterns in the monitored subscriber packet flows (170). For example, machine leaning device 30 may generate the altered parameters and apply them to the network device while the network device is live, e.g., still operating on subscriber packet flows. In another example, machine learning device 30 may generate the altered parameters and send them to the network device and the network device may apply the altered parameters while the network device is live, e.g., still operating on subscriber packet flows. In some examples, machine learning device 30 may then continue to monitor subscriber packet flows (160). In other examples, machine learning device 30 or the network device may inform an administrator that parameters have been altered and how they were altered (172). In some examples, the administrator may then be asked to approve of the altered parameters (175). In response to receiving data indicative of approval of the altered parameters, ("YES" branch of 175), machine learning device may continue to monitor subscriber packet flows (160). In response to receiving data indicative of rejection of the altered parameters, ("NO" branch of 175), machine learning device 30 or the network device may reverse the parameters back to the prior parameters (180). In some examples, a predetermined time limit may be place on the administrator to either accept or reject the altered parameters, for example 30 minutes. In one example, machine learning device 30 or the network device automatically accept the altered parameters if the time period expires. In another example, machine learning device 30 or the network device automatically reject the altered parameters if the time period expires and machine learning device 30 or the network device automatically reverse the altered parameters to previous parameters while the network device is live, e.g., still operating on subscriber packet flows.

Figure 8:
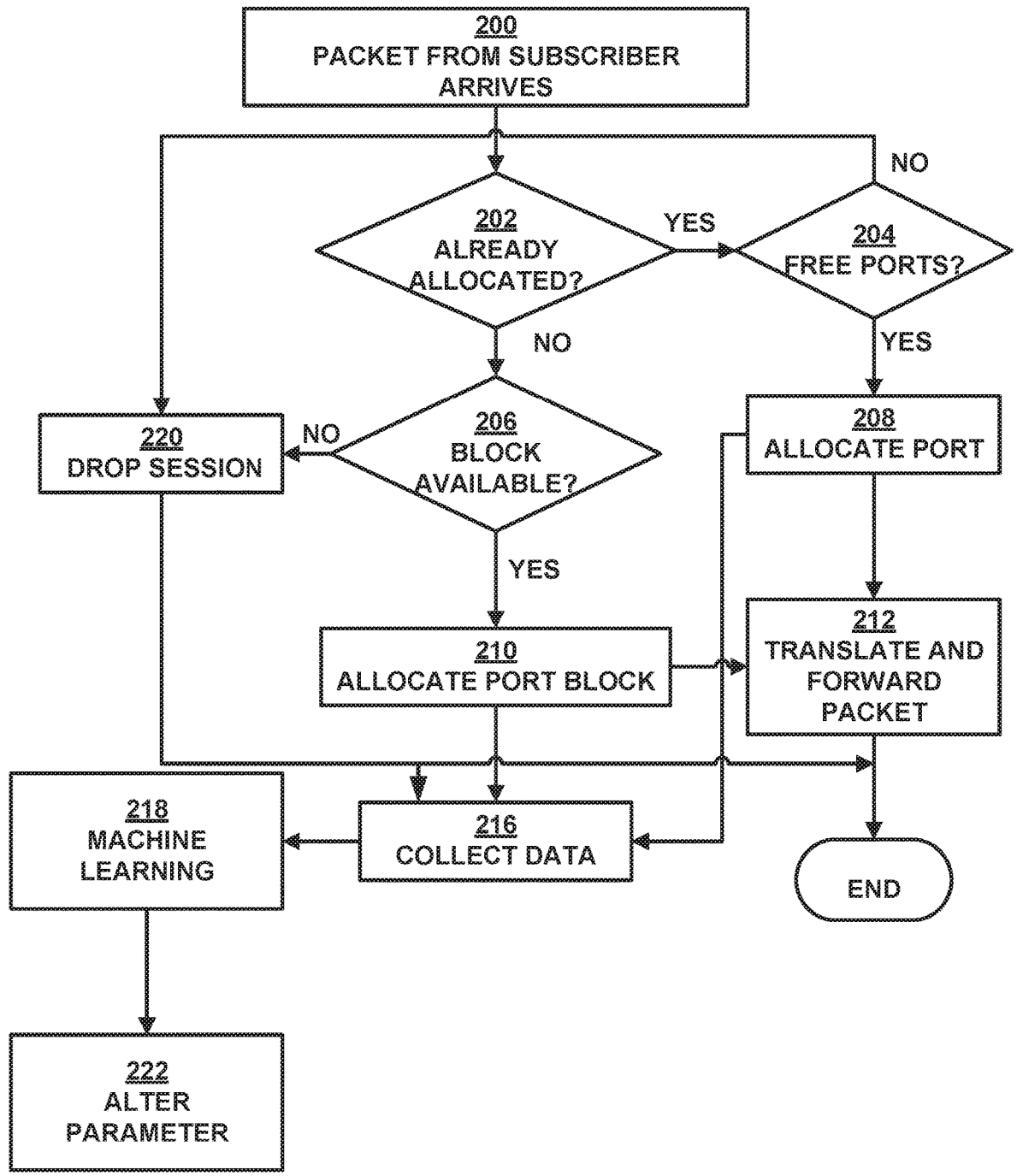
FIG. 8 is a flow diagram illustrating the dynamic altering of static parameters on a CG-NAT network device according to the techniques of this disclosure.

FIG. 8 is a flow diagram illustrating the dynamic altering of static parameters on a CG-NAT network device according to the techniques of this disclosure. A packet from a subscriber arrives at the CG-NAT network device (e.g., AFTR 22) with a static port block size parameter already configured (200). AFTR 22 determines whether there is already an allocated port block for the subscriber (202). In response to determining there is already an allocated port block for the subscriber, AFTR 22 determines whether there are any free ports in the allocated port block (204). In response to determining there are no free ports in the allocated port block, AFTR 22 drops the session (220). In response to determining there are free ports in the allocated port block, AFTR 22 allocates a port(s) from the allocated port block (208) and AFTR 22 translates and forwards the packet from the subscriber (212). AFTR 22 may also collect data regarding port usage by subscribers (216). This port usage data may be provided to machine learning device 30 by AFTR 22 or may be retrieved from AFTR 22 by machine learning device 30 (218). In some examples, the transfer of port usage data to machine learning device 30 may be performed at regular intervals. Machine learning device 30 may analyze the port usage data and predict an optimal port block size based upon the collected port usage data. Machine learning device 30 may alter the port block size parameter based on the port usage data to, for example, the predicted optimal port block size (222).

In response to determining the subscriber does not have a port block allocated, AFTR 22 may determine whether there is a port block available (206). In response to determining there is not a port block available, AFTR 22 may drop the session (220). In response to determining there is a port block available, AFTR 22 may allocate a port block to the subscriber (210) and translate and forward the packet (212). AFTR 22 may collect port usage by subscribers data (216). Machine learning device 30 may analyze the port usage data and predict an optimal port block size based upon the collected port usage data. Machine learning device 30 generated an altered port block size parameter based on the port usage data, which may be for example, a predicted optimal port block size or more efficient port block size and apply the altered port block size parameter to AFTR 22 while AFTR 22 is live, e.g., still operating on subscriber traffic flows (222). Alternatively, machine learning device 30 may generate the altered port block size parameter and send it to AFTR 22 and AFTR 22 may apply the altered port block size parameter to itself (AFTR 22) while it is live, e.g., still operating on subscriber traffic flows.

Other CG-NAT parameters, such as number of port blocks per private subscriber or active block timeout, related to port block allocation may be similarly analyzed by machine learning device 30 and altered when appropriate.

The techniques of this disclosure may be implemented in a wide variety of devices or apparatuses, including a network device, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware and software and/or firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable storage medium comprising instructions that, when executed in a processor, performs one or more of the methods described above. The computer-readable storage medium may be a physical structure, and may form part of a computer program product, which may include packaging materials. In this sense, the computer readable medium may be non-transitory. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), Flash memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry or processing circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

The invention claimed is:

1. A system comprising:
a live network device having a plurality of static parameters configured thereon that control application of services to subscriber packet flows forwarded by the live network device in a network; and
a machine learning device operable to monitor the subscriber packet flows and apply a machine learned model to identify patterns in the monitored subscriber packet flows and operable to dynamically alter at least one of the plurality of static parameters based upon the patterns in the monitored subscriber packet flows and through a management process of the live network device.

2. The system of claim 1, wherein the live network device comprises a carrier grade network address translation (CGNAT) device and the at least one of the plurality of static parameters comprises at least one of port block sizes, network address translation (NAT) mapping timeout values, NAT session inactivity timeout values, or max-session-per-subscriber values.

3. The system of claim 2, wherein the CGNAT device comprises the machine learning device.

4. The system of claim 1, wherein the live network device comprises a software defined wide area network device and the at least one of the plurality of static parameters comprises at least one of a create threshold or a delete threshold, wherein the live network device is operable to create at least one full mesh tunnel between two sites in response to determining that a number of subscriber packet flows between the two sites exceeds the create threshold and the live network device is operable to delete at least one full mesh tunnel between two sites in response to determining that the number of subscriber packet flows between the two sites falls below the delete threshold.

5. The system of claim 1, wherein the at least one of the plurality of static parameters comprises an Application Quality of Experience (AppQoE) service level agreement parameter.

6. The system of claim 1, wherein the at least one of the plurality of static parameters comprises at least one of an Application Quality of Experience (AppQoE) probe interval or an AppQoE probe count.

7. The system of claim 1, wherein the live network device comprises a flow exporter and the at least one of the plurality of static parameters comprise at least one of a flow inactivity timeout, an inactivity export timeout or an activity export timeout.

8. The system of claim 1, wherein the at least one of the plurality of static parameters is altered further based on a time of day.

9. The system of claim 1, wherein the altering comprises:
automatically altering for a predetermined time period, and
reversing the altering after the predetermined time period if data indicative of approval of the altering is not received during the predetermined time period.

10. A method comprising:
monitoring, by a machine learning device, subscriber packet flows;
applying, by the machine learning device, a machine learned model to identify patterns in the monitored subscriber packet flows; and
dynamically altering at least one of a plurality of static parameters of a live network device based upon the patterns in the monitored subscriber packet flows and through a management process of the live network device, wherein the plurality of static parameters are configured on the live network device and control application of services to subscriber packet flows.

11. The method of claim 10, wherein the live network device comprises a carrier grade network address translation (CGNAT) device and the at least one of the plurality of static parameters comprises at least one of port block sizes, network address translation (NAT) mapping timeout values, NAT session inactivity timeout values, or max-session-per-subscriber values.

12. The method of claim 11, wherein the CGNAT device comprises the machine learning device.

13. The method of claim 10, wherein the live network device comprises a software defined wide area network device and the at least one of the plurality of static parameters comprises at least one of a create threshold or a delete threshold, further comprising:
creating, by the live network device, at least one full mesh tunnel between two sites in response to determining a number of subscriber packet flows between the two sites exceeds the create threshold; and
deleting, by the live network device, at least one full mesh tunnel between the two sites in response to determining the number of subscriber packet flows between the two sites falls below the delete threshold.

14. The method of claim 10, wherein the at least one of the plurality of static parameters comprises an Application Quality of Experience (AppQoE) service level agreement parameter.

15. The method of claim 10, wherein the at least one of the plurality of static parameters comprises at least one of an Application Quality of Experience (AppQoE) probe interval or an AppQoE probe count.

16. The method of claim 10, wherein the live network device comprises a flow exporter and the at least one of the plurality of static parameters comprise at least one of a flow inactivity timeout, an inactivity export timeout or an activity export timeout.

17. The method of claim 10, wherein the altering is further based on a time of day.

18. The method of claim 10, wherein the altering comprises:
automatically altering for a predetermined time period, and
reversing the altering after the predetermined time period if data indicative of approval of the altering is not received during the predetermined time period.

* * * * *